(12) United States Patent
Gutt et al.

(10) Patent No.: US 8,335,784 B2
(45) Date of Patent: Dec. 18, 2012

(54) VISUAL SEARCH AND THREE-DIMENSIONAL RESULTS

(75) Inventors: Zachary Mark Gutt, Seattle, WA (US); Paul Ronald Ray, Redmond, WA (US); Rodney Coleman Edwards, New York, NY (US); Darwin Kengo Yamamoto, New York, NY (US); Hady Moustafa Abou El Kheir, Santa Clara, CA (US); Brian Whalen MacDonald, Bellevue, WA (US); Jerry Daniel Bain, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 12/551,236

(22) Filed: Aug. 31, 2009

(65) Prior Publication Data

US 2011/0055203 A1    Mar. 3, 2011

(51) Int. Cl.
*G06F 7/00* (2006.01)
*G06F 17/30* (2006.01)

(52) U.S. Cl. ........ 707/722; 707/805; 715/825; 715/855; 715/738

(58) Field of Classification Search ............... None
See application file for complete search history.

(56) References Cited

U.S. PATENT DOCUMENTS

| | | | |
|---|---|---|---|
| 5,911,139 A * | 6/1999 | Jain et al. | 1/1 |
| 6,434,556 B1 * | 8/2002 | Levin et al. | 1/1 |
| 6,505,194 B1 | 1/2003 | Nikolovska | |
| 6,567,103 B1 | 5/2003 | Chaudhry | |
| 7,437,370 B1 * | 10/2008 | Ershov | 1/1 |
| 7,735,018 B2 * | 6/2010 | Bakhash | 715/782 |
| 2006/0116994 A1 * | 6/2006 | Jonker et al. | 707/3 |
| 2007/0180408 A1 | 8/2007 | Rusu | |

FOREIGN PATENT DOCUMENTS

KR    1020080028574    1/2008

OTHER PUBLICATIONS

Marian Dork, et al., "Towards Visual Web Search: Interactive Query Formulation and Search Result Visualization," http://www.wssp.info/2009/WSSP2009DorkWilliamsonCarpendale.pdf.

(Continued)

*Primary Examiner* — Pierre Vital
*Assistant Examiner* — Loan T. Nguyen
(74) *Attorney, Agent, or Firm* — Shook, Hardy & Bacon L.L.P.

(57) ABSTRACT

Methods, systems, graphical user interfaces, and computer-readable media for visually searching and exploring a set of objects are provided. A computer system executes a method that generates three-dimensional representations or two-dimensional representations for a set of objects in response to a user interaction with an interface that displays the three-dimensional representations or the two-dimensional representations. The interface includes filter controls, sorting controls, and classification controls, which are dynamically altered based on the content of a user query or the attributes of the objects in the three-dimensional representations or two-dimensional representations.

12 Claims, 7 Drawing Sheets

OTHER PUBLICATIONS

Jonathan C. Roberts, et al., "Visual Bracketing for Web search Result Visualization," http://ieeexplore.ieee.org/stamp/stamp.jsp?tp=&arnumber=1217989&isnumber=27378.

"FirstStop WebSearch™," http://www.brushgroup.com/products/products.htm.

Kunle Campbell, "Google Search Has Changed Forever with Google Search Options," http://www.fuzzone.com/blog/173/search-engine-optimisation/google-search-has-changed-forever-with-google-search-options/. May 13, 2009.

Arnold Zafra, "Yahoo Brings Visual Search Display, Glue to the US," http://www.searchenginejournal.com/yahoo-brings-visual-search-display-glue-to-the-us/8062/. Nov. 20, 2008.

Search Report Mailed Apr. 7, 2011 in PTC Application "PCT/US2010/046398".

* cited by examiner

FIG. 1

| WEB | IMAGES | VIDEOS | SHOPPING | NEWS | MAPS | MORE |

CARS  🔍 — 210

1-10 OF 103,000,000 RESULTS - ADVANCED

ALL RESULTS

ALL RESULTS
:EXPLORE NEW CARS: — 230

RELATED SEARCHES
USED CARS
2009 NEW CARS
FAST CARS
CLASSIC CARS
CARS FOR SALE
CARS MOVIE
OLD CARS
MUSCLE CARS
HOT CARS
CARTOON NETWORK

SEARCH HISTORY
YOUR SEARCH HISTORY ISN'T AVAILABLE RIGHT NOW. CHECK LATER.

<u>BUY CARS ONLINE, NEW & USED CAR SEARCH, AUTO CLASSIFIEDS</u>
SEARCH 2.6 MILLION NEW & USED CAR LISTINGS, PRICE A NEW CAR, GET A DEALER QUOTE, READ EXPERT REVIEWS, OR SELL YOUR CAR FOR THOUSANDS OVER TRADE IN
WW.CARS.COM – <u>CACHED PAGE</u>   <u>- MARK AS SPAM</u>
   BUY   ABOUT
   SELL   CONTACT
   RESEARCH   CAREERS
   ADVICE
SHOW MORE RESULTS FROM WW.CARS.COM <u>CARS – THE OFFICAL DVD AND BLU-RAY DISC WEBSITE</u> — 220
WALT DISNEY PICTURES AND PIXAR ANIMATION STUDIOS PRESENTS IT'S LATEST ANIMATED ADVENTURE, CARS. IN THEATERS JUNE 9TH
WW.DISNE0.COM/DISNEYPICTURES/CARS – <u>CACHED PAGE</u>   <u>- MARK AS SPAM</u>

<u>CARS.COM MOBILE</u>
1. SEARCH USED CAR LISTING: 2. SEARCH NEW CAR LISTING: 3. KELLY BLUE BOOK USED CAR VALUES: 4: NEW CAR PRICES AND SPEC6: 5. DEALER LOCATOR
WW.MOBILECARS.COM – <u>CACHED PAGE</u>   <u>- MARK AS SPAM</u>

<u>CALIFORNIA ASSOCIATION OF RESOURCE SPECIALISTS AND SPECIAL...</u>
CARS+ IS THE ONLY ORGANIZATION WHOSE SOLE PURPOSE IS TO REPRESENT THE UNIQUE NEEDS OF RESOURCE SPECIALISTS AND OTHER SPECIAL EDUCATI...
WW.CARSPLUS.ORG – <u>CACHED PAGE</u>   <u>- MARK AS SPAM</u>

VISUAL SEARCH AND THREE-DIMENSIONAL RESULTS

BACKGROUND

Conventionally, search engines are configured to provide results that include one or more terms of a search query. Conventional search engines may use indices storing references to electronic documents and the terms included in the electronic documents to generate the results. The search engine includes the references to the electronic documents identified in an index having similar terms in the results.

Some conventional search engines may provide search suggestions to a user when one or more terms are entered in a conventional search interface for the conventional search engine. The suggested terms may be selected and used to locate electronic documents that include the entered terms and the selected suggested terms. However, the terms entered in the search interface or the suggested terms may not correspond to an object that is sought by a user.

The conventional search interface fails to provide adequate assistance in formulating terms for a set of objects that is sought by the user. A seeker hopes to complete a task upon locating the set of objects. But the seeker may be confronted with difficulty in formulating a search query that causes the search engine to provide the set of objects that is sought. For instance, the seeker may be searching for any of the following: best American-made hybrid cars on the market under $25,000; child-friendly movies playing today in my area; or netbooks under $400. The seeker may have difficulty locating the set of objects may resort to trial and error to formulate terms for the set of objects. Because the conventional search engine only performs term match using each term in the user search query, the actual content results often doesn't exactly correspond to the set of objects that is sought by the user.

SUMMARY

Embodiments of the invention overcoming these and other problems in the art relate in one regard to a computer system, graphical user interface, and computer-implemented method to visually search and explore a set of objects. The computer system renders images associated with a set of objects and transitions between a three-dimensional interface and two-dimensional interface when narrowing the set of objects.

The computer system allows a user to visually search through and explore a set of objects related to a user's intent. The computer system includes a database and a server. The database is configured to store objects, attributes for each object, and images associated with each object. The server is connected to the database. The server retrieves a set of images and attributes in response to a visual search request. In turn, the server or client may generate a graphical user interface to organize the images and attributes. The graphical user interface may dynamically transition between a three-dimensional representation of the set of images and a two-dimensional representation of the set of images based on the number of images remaining in the set of images.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

Embodiments of the invention provide a computer system that allows a user to visually search through and explore a set of objects included in a graphical user interface that contains the results to a user query or browsing request. The objects in the set of objects may correspond to, but is not limited to, shopping products, automobile products, animals, famous people, entertainment media, travel, or sports. In certain embodiments, the graphical user interface implements visual search and exploration by allowing the user to express ideas and search terms without having to formulate words for them. The graphical user interface may render a visual representation for each object and important attributes for the set of objects. The important attributes include attributes that users frequently use to evaluate the set of objects. Users can visually interact with the important attributes rather than formulate textual queries to narrow the set of objects. Additionally, the graphical user interface may include tangentially related categories to provide a user with an opportunity to serendipitously discover objects or relationships that are unknown to the user. Furthermore, each object in the graphical user interface may be linked with a query that may be previewed in a search box when a pointer hovers over the object. In turn, the query may be executed by clicking on the object. And the graphical user interface may dynamically adapt based on the number of items currently available in the set of objects. Accordingly, the computer system may be used to narrow a set of objects, to identify new items in a given field, e.g., new car models, new books, new movies in theaters—especially when the name of the objects are unknown, or to surface interesting and popular facts associated within a selected category.

As one skilled in the art will appreciate, the computer system may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include random access memory (RAM), read only memory (ROM), electrically erasable programmable read only memory (EEPROM), flash memory or other memory technology, compact-disc read only memory (CD-ROM), digital versatile discs (DVD), holographic disc or other optical disc storage, magnetic cassettes, magnetic tape, magnetic disk storage, and other magnetic storage devices. These memory technologies can store data momentarily, temporarily, or permanently.

Figure 1:
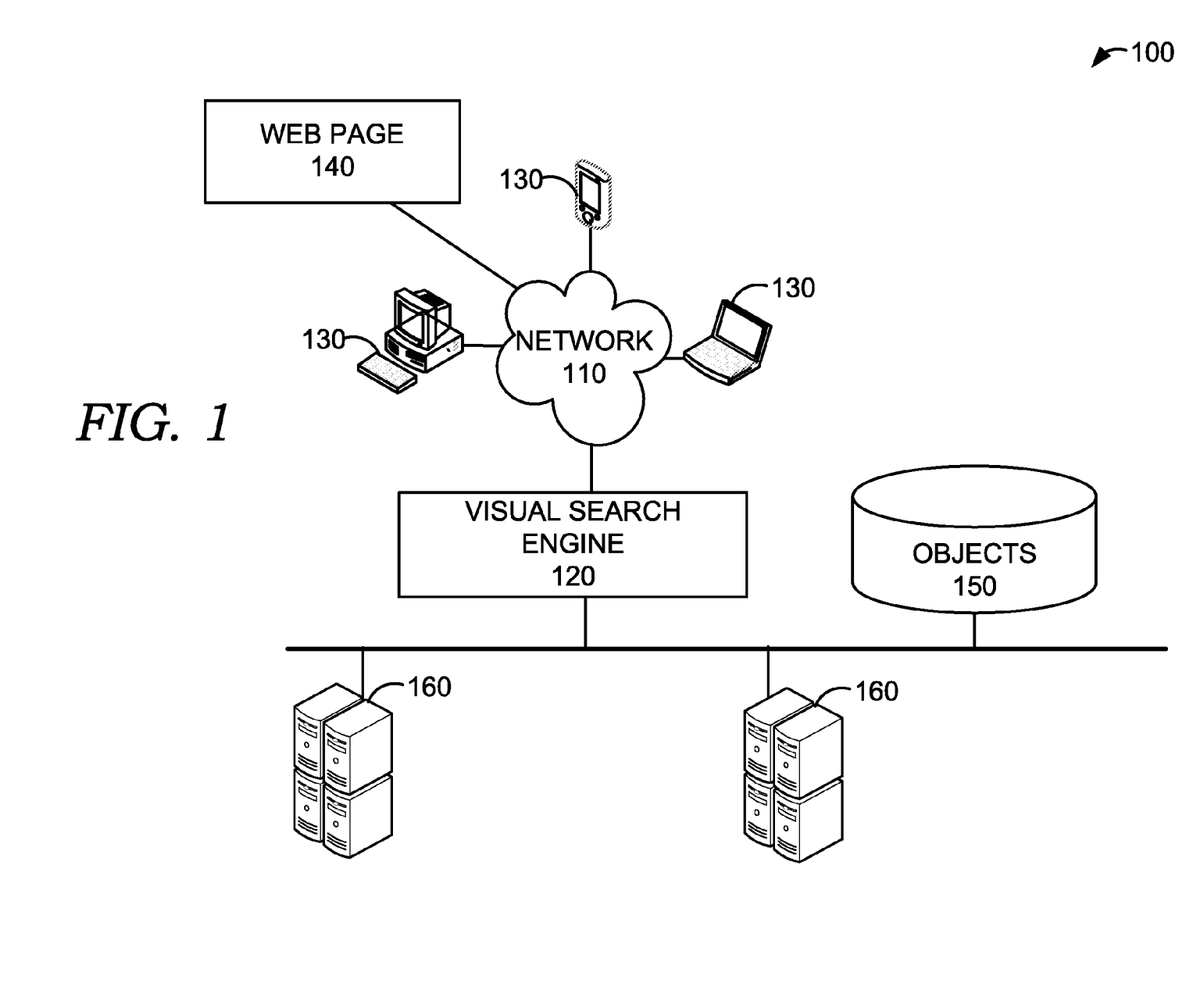
FIG. 1 is a network diagram that illustrates an exemplary computing system in accordance with embodiments of the invention.

FIG. 1 is a network diagram that illustrates an exemplary operating environment 100, in accordance with embodiments of the invention. The operating environment 100 shown in FIG. 1 is merely exemplary and is not intended to suggest any limitation as to scope or functionality. Embodiments of the invention are operable with numerous other configurations. With reference to FIG. 1, the operating environment 100 includes a network 110, a visual search engine 120, client devices 130, web pages 140, an objects database 150, and index servers 160.

The network 110 is configured to facilitate communication between the client devices 130 and the visual search engine 120. The network 110 also facilitates communication between the objects database 150, the visual search engine 120, and the index servers 160. The network 110 may be a communication network, such as a wireless network, local area network, wired network, or the Internet. In an embodiment, the client devices 130 interact with the visual search engine 120 utilizing the network 110. In response, the visual search engine 120 provides web pages, images, videos, or other electronic documents that contain terms provided or selected by the user.

The visual search engine 120 is communicatively connected via network 110 to the client devices 130, the objects database 150, and the index servers 160. In certain embodiments, the visual search engine 120 is a server that generates visual representations for display on the client devices 130. The visual search engine 120 receives, over network 110, selections of terms or selections of links from client devices 130 that provide interfaces that receive interactions from users. The visual search engine 120 may generate a three-dimensional or two-dimensional representation to display objects that correspond to terms or links selected by the user. The visual representation may include, but is not limited to, timelines, maps, grids or tables that organize the objects on the display. In one embodiment, the visual search engine 120 is connected to a search engine to retrieve search results in response to a query formulated and issued by the visual explore engine.

In certain embodiments, the visual search engine 120 traverses the objects database 150 to identify objects that correspond to the selections received from the client devices. In turn, the objects database 150 transmits a set of objects that satisfies the selections to the visual search engine 120. The set of objects are associated with object queries, web pages 140, images, videos, or other electronic documents.

The visual search engine 120 may also traverse the index servers 160 to locate web pages 140 that satisfy the object queries or user queries. In turn, the index servers 160 transmit a set of uniform resource locators (URLs) that point to web pages, images, videos or other electronic documents that satisfy the object queries or user queries. The visual search engine 120 formats the URLs and transmits the URLs to the client devices 130.

The client devices 130 are utilized by a user to generate search terms, to hover over objects, or to select links or objects, and to receive results or web pages 140 that are relevant to the search terms, the selected links, or the selected objects. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the visual search engine 120 to receive the results or web pages 140 that are relevant to the search terms, the selected links, or the selected objects. In some embodiments, the client devices 130 execute a Silverlight browser application. The Silverlight browser application may provide an interactive experience when formulating search terms for an item and receiving results that response to a user request or the formulated search terms. When the client device 130 receives objects or web pages 140 selected by the visual search engine 120, the Silverlight browser application only renders a subset of the items that satisfy the user request. Moreover, when the user scrolls through the display of the client device 130, the Silverlight browser application may randomly populate the results with some of the additional objects by illustrating at least one object of the additional objects in each row of the display real estate of the client device 130 as the visual search engine transmits the remaining additional objects to the client device 130.

The web pages 140 provide details about items that interest the user. The web pages 140 are indexed by the index servers 160. Each web page 140 may include terms or metadata. The terms or metadata is used by the index servers to store the web page in an appropriate location. Additionally, the web pages 140 are associated with URLs that are also stored by the index servers 160.

The objects database 150 stores attributes and images for each object. The attributes include titles, image size, image dimensions, and other metadata for the object. The visual search engine 120 may request one or more objects from the objects database 150. In turn, the objects database 150 transmits attributes and images to the visual search engine 120.

The index servers 160 store web pages 140, terms associated with each web page 140, and uniform resource locators (URLs) corresponding to the web pages 140. The visual search engine 120 may request one or more web pages 140 from the index servers 160. In turn, the index servers 160 transmit the web pages to the visual search engine 120.

Accordingly, the operating environment 100 is configured with a visual search engine 120 that provides results that include web pages 140 and objects to the client devices 130. The visual search engine 120 traverses the object database 150 and traverses the index servers 160 to obtain results that satisfy the requests received from the users. In turn, the client devices 130 render the results for display to the users.

In an embodiment, the visual search engine generates a graphical user interface that includes results that match terms provided by or selections selected by the user. The results may include URLs that point to web pages. The graphical user interface contains a link that reformats the results into a visual representation. The link to the visual representation may be highlighted on the graphical user interface.

Figure 2:
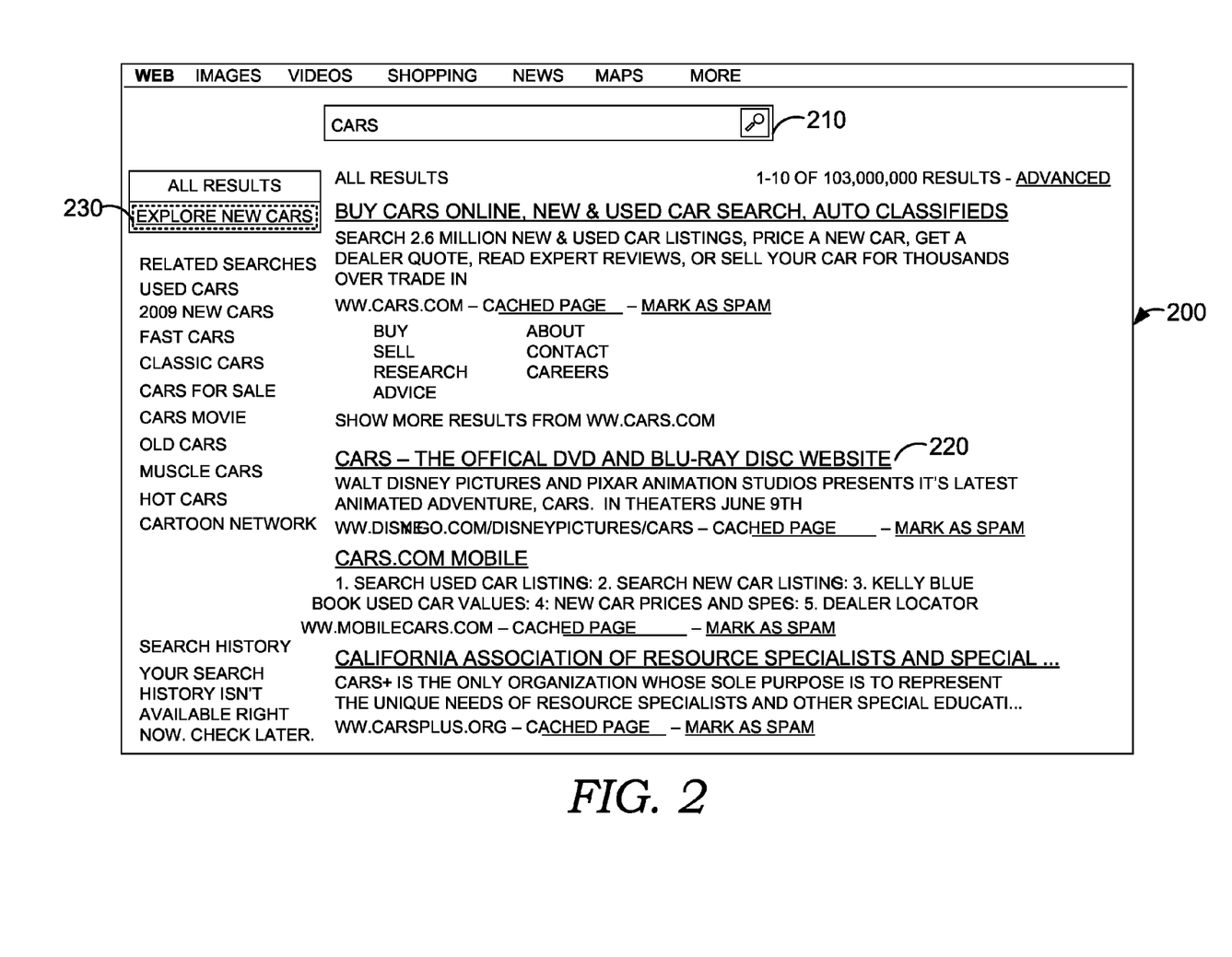
FIG. 2 is a graphical user interface that illustrates a search results page having a visual search link in accordance with embodiments of the invention.

FIG. 2 is a graphical user interface 200 that illustrates a search results page having a visual search link in accordance with embodiments of the invention. The graphical user interface 200 includes a search box 210 and a visual search link 230.

The search box 210 in the graphical user interface 200 allows the user to formulate their own search terms for a search query. The search box 210 receives search terms provided by the user. In turn, the search terms are utilized by the visual search engine to obtain search results that match the terms entered in the search box 210.

The visual search link 230 is part of the graphical user interface 200. The visual search link 230 allows the user to explore results of a search query visually. Additionally, the visual search link 230 may also allow the user to visually formulate a query without having to enter their own search terms. In some embodiments, the visual representation of the search results is a three-dimensional representation.

For instance, when a user enters "cars" in the search box 210 and initiates a search using the term "cars" the visual search engine may recognize that the user hopes to complete a task associated with purchasing a used or new car. The results that a search engine returns may not aid the user in completing the task associated with purchasing a used or new car. The visual search engine ignores the results from the search engine and provides a visual display having visual representations of cars that are currently for sale in the user's location. The user may interact with the visual representation and features of the graphical user interface 200 to locate the "cars" that the user seeks.

Alternatively, when a user enters "cars" in the search box 210 and initiates a search using the term "cars" the visual search engine may return results that consist of web pages 140 that include the term car. However, when the user clicks on the visual search link 230, the visual search engine generates a visual representation of the results. The user may interact with the visual representation and features of the graphical user interface 200 to locate the "cars" that the user seeks.

In certain embodiments, the visual search engine may provide a browse entry point that does not require entry of a query terms. The browse entry page may include a collection of objects arranged by category. Each of the objects may be represented by an image and may correspond to a visual query.

In one embodiment, the visual representation generated by the visual explore engine, in response to a user request, to visually explore the search results is a three-dimensional representation of the search results. A graphical user interface displays the three-dimensional representation and controls that are used to interact with the three-dimensional representation. In turn, the user can narrow the objects included in the three-dimensional representation.

Figure 3:
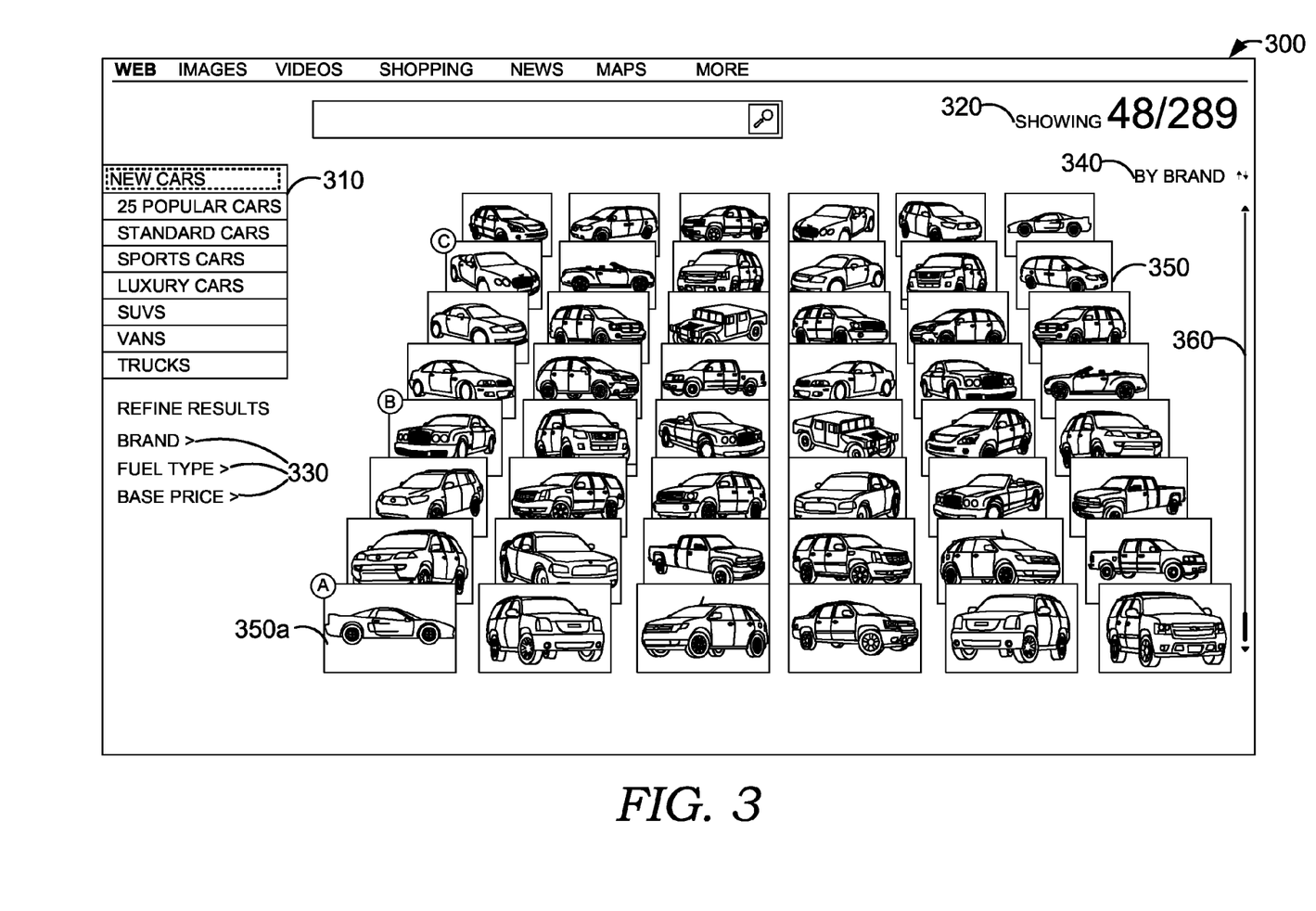
FIG. 3 is a graphical user interface that illustrates images for a set of objects in a three-dimensional representation in accordance with embodiments of the invention.

FIG. 3 is a graphical user interface 300 that illustrates images for a set of objects 350a in a three-dimensional representation 350 in accordance with embodiments of the invention. The visual search engine generates a visual representation in graphical user interface 300 when the user clicks on the visual search link in a graphical user interface that includes URL results for search terms provided by the user. The graphical user interface 300 replaces the URL results with the visual representation (three-dimensional or two-dimensional) based on the number of objects 350a and the dimensions of the objects 350a. The visual search engine animates the objects as the objects are rendered in the graphical user interface 300. When the visual search engine generates the three-dimensional representation 350, the objects 350a move from the background of the graphical user interface 300 and arrange themselves into an overlapping three-dimensional array of objects. In turn, the visual search engine animates controls on the left and right of the graphical user interface 300 by floating the controls onto the graphical user interface 300 from the left and right. The user can move a pointer to interact with the controls that that are on the left side and the right side of the graphical user interface 300 to manipulate the objects 350a. In some embodiments, the visual search engine generates the visual representation in the graphical user interface 300 when the user clicks on a visual search link without requiring the user to provide search terms.

The graphical user interface 300 includes category control 310, count control 320, refine controls 330, sort control 340, and scroll control 360 that are used to interact with the objects 350a included in the three-dimensional representation 350. The graphical user interface 300 allows the users to view all objects that match the search terms provided by the users. The graphical user interface 300 loads less then all of the objects but the scroll control 360 provides an infinite scroll feature that allows the users to view additional objects in the visual representation that are currently outside of the viewable region of the three-dimensional representation 350. In one embodiment, the graphical user interface 300 may load the data for all objects, but stream the images as the specific objects come into view as the scroll control 360 reveals the additional objects. In another embodiment, the graphical user interface may only load a subset of the data and the corresponding images to allow the user to quickly interact with some of the objects. The additional data and images are loaded as requested via the scroll control 360.

The category control 310 identifies the categories associated with each object in the three-dimensional representation 350. The number objects 350a in the three-dimensional representation 350 may be reduced when the user selects the category control 310. In some embodiments, the three-dimensional representation 350 animates the objects 350a as the visual search engine reduces the number of objects 350a in the three-dimensional representation 350. The objects 350a that are not within the selected category drop or fade into a background of the graphical user interface 300. Additional objects 350a that satisfy the selected category replace the removed objects 350a in the three-dimensional representation 350. All the objects 350a that are in the updated three-dimensional representation 350 satisfy a category selected in the category control 310.

For instance, a user may select sport utility vehicle (SUV) as a category when searching for cars. In response to the user selection, the visual search engine updates the objects 350a in the three-dimensional representation 350 by removing objects 350a that are not categorized as SUVs. The objects 350*a* that do not satisfy the user selection are animated by the visual search engine to fall out of the three-dimensional representation 350 and additional objects that are outside the viewable region of the three-dimensional representation 350 are animated to replace the removed objects 350*a*.

In another embodiment, the visual search engine may update the category control 310 with a new link based on a previous search performed by the user. When the user's previous search is for a specific item or a branded item, the visual search engine creates a link that is associated with a visual representation of objects having features similar to the specific item or branded item. When the user selects the link, the visual search engine generates an interface having objects with similar features. Additionally, the visual search engine may include links in the category control 310 to information that is tangentially related to the previous search. For instance, if a user was looking for all of the new cars for sale and hovered over an Aston Martin, the category control 310 may update to show links to James Bond movies currently playing in movie theaters (because James Bond drives Aston Martins), and the country England (because Aston Martins are produced in England).

The count control 320 displays the total number of items that are in the visual representation and the number of items that are currently displayed in the viewable regions of the graphical user interface 300. The count control 320 updates as the user reduces or increases the objects that are within the visual representation (e.g. three-dimensional representation 350). The count control 320 updates when the user initiates a search with new or additional search terms. Alternatively, the count control 320 updates when the user interacts with the category control 310 or refine controls 330 to manipulate the objects 350*a* in the graphical user interface 300.

The refine controls 330 represent attributes that are shared by some of the objects 350*a* that are within the visual representation. The number objects 350*a* in the three-dimensional representation 350 may be reduced when the user selects a value for the attributes represented by the refine controls 330. In some embodiments, the three-dimensional representation 350 animates the objects 350*a* as the visual search engine reduces the number of objects 350*a* in the three-dimensional representation 350. The objects 350*a* that fail to satisfy the value selected for the attributes represented by the refine controls 330 drop or fade into a background of the graphical user interface 300. Additional objects 350*a* that satisfy the value selected for the attributes represented by the refine controls 330 replace the removed objects 350*a*. All the objects 350*a* that are in the updated visual representation (e.g. updated three-dimensional representation 350) satisfy the values selected for the attributes represented by the refine controls 330. In some embodiments, the attributes in the refine controls 350 are updated to provide only valid filtering options. For instance, when a user selects "Sport Utility Vehicle" as the vehicle type filter, the brand filter may automatically to remove manufacturers or brands that do not offer a "Sport Utility Vehicle."

The sort control 340 allows the user to sort the objects 350*a*. The sort control 340 reorganizes the objects 350*a* in the three-dimensional representation 350. The sort control 330 represents attributes that are shared by all the objects 350*a* in the visual representation. The objects 350*a* are sorted alphabetically by default. When the user selects the sort control, the visual search engine can reorganize the objects 350*a* in the visual representation. For instance, when the user is searching for cars, the sort control 340 may allow the user to sort the objects 350*a* by brand, safety rating, or expert rating. The visual search engine obtains the brand, safety rating, and expert rating from the objects database, which stores attributes for brand, safety rating, and expert rating for the objects. After the user selects an attribute, the visual search engine reorders the objects in the visual representation. In an embodiment, the attributes that are included in sort control are selected based on search frequency in a search log.

The scroll control 360 allows the user to view additional objects 350*a* that are within the visual representation. In some embodiments, the scroll control provides infinite scroll, which allows the graphical user interface 300 to continuously scroll through the objects 350*a* in the visual representation. The infinite scroll continuously loops through all objects 350*a* within the visual representation.

In some embodiments, the visual search engine transitions between a three-dimensional representation 350 of the objects 350*a* and a two-dimensional representation. The visual search engine generates the three dimensional representation 350 when the number of objects that are selected for display in the graphical user interface is large. When the user reduces the number of objects to a reasonable number, the visual search engine may render the objects in a two-dimensional representation. In one embodiment, the remaining objects are reoriented by the visual search engine in rows that are viewable without scrolling. Also, the visual search engine may render a boundary around each of the remaining objects 350*a*.

For instance, the visual search engine may set a display default that requires generating a graphical user interface with detailed information for each object. However, the graphical user interface must also display as many of the objects that satisfy the user selection in the visual representation. The three-dimensional visual representation 350*a* of the objects may be generated by the visual search engine when the number of objects is large and showing detailed information would obscure the graphical user interface. The two-dimensional visual representation may be generated by the visual search engine when the number of objects is small and showing detailed information would not obscure the graphical user interface. Additionally, because the available display real estate increases, the visual search engine displays more information for each object. In some embodiments, images associated with each object are sized to 100 pixel by 100 pixels and the two-dimensional representation includes an array having a minimum of five rows and five columns of images.

In an embodiment, a two-dimensional representation of the objects is generated by the visual explore engine. The two-dimensional representation allows the user to view additional information about each object on the graphical user interface. The visual search engine uses the available display real estate on the graphical user interface to maximize information that is rendered for display to the user.

Figure 4:
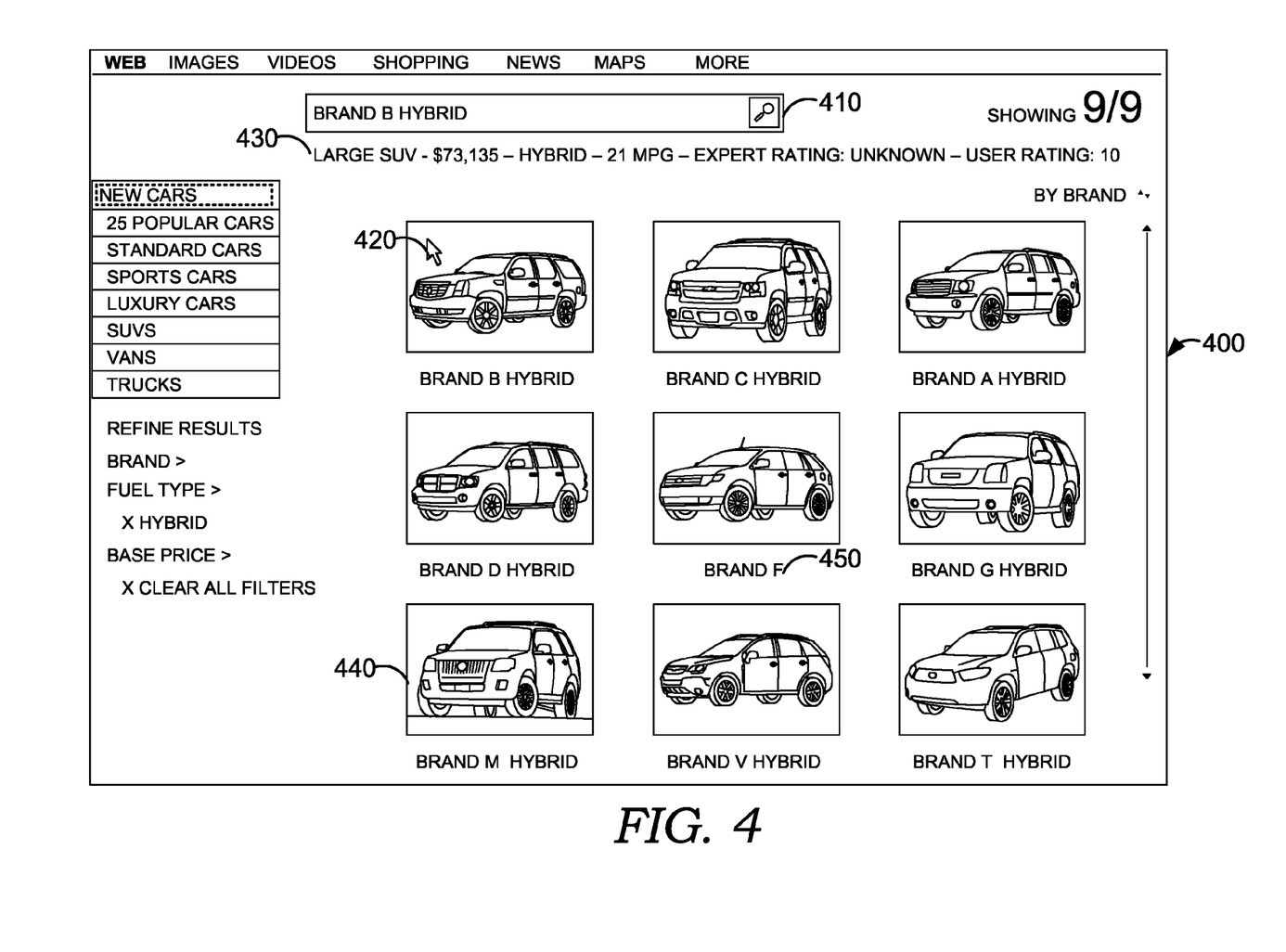
FIG. 4 is a graphical user interface that illustrates metadata surfaced for each object in a two-dimensional representation in accordance with embodiments of the invention.

FIG. 4 is a graphical user interface 400 that illustrates metadata surfaced for each object in a two-dimensional representation 440 in accordance with embodiments of the invention. The visual search engine generates the two-dimensional representation 440 in graphical user interface 400 based on the number of objects that are selected for rendering. In one embodiment, the visual search engine may generate the two-dimensional representation 440 in graphical user interface 400 when the number of objects that are selected for display is viewable without scrolling. In some embodiments, the visual search engine may reformat the images associated with the objects to fit in the graphical user interface 400 without scrolling. In other embodiments, the visual search engine may generate the two-dimensional representation 440 in graphical user interface 400 when the number of objects allows for comparison of the objects based on the available metadata that is viewable on the graphical user interface 400.

The graphical user interface 400 includes search box 410, pointer 420, metadata displays 430, the two-dimensional representation 440, and object labels 450. The search box 410 allows the user to enter search terms that should be sent to the visual explore engine. The search box 410 includes a search icon that causes the visual search engine to initiate a search with the search terms contained within the search box 410. The search box 410 also automatically displays search queries associated with each object in the two-dimensional representation 440 when a user hovers over an object with the pointer 420. The user may initiate a search using the search queries that are automatically displayed in the search box 410 in response to the hover by clicking on the search icon included in the search box 410. Alternatively, the user may initiate a search by using the search queries associated with each object by clicking on the object with the pointer 420. When the user clicks on the object with the pointer 420, the visual search engine searches the index server and objects database using the search queries associated with the object.

In some embodiments, the pointer 420 is a mouse that allows the user to hover over objects, click on objects, or drag and drop objects. The graphical user interface 400 may be updated based on the actions performed using the pointer 420. When the pointer hovers over an object in the two-dimensional representation 440, the visual search engine renders additional information about each object on the graphical user interface 200.

The metadata displays 430 provide information about the objects in the two-dimensional representation 440. In one embodiment, the metadata display 430 provides a limited amount of information that corresponds to the objects when the pointer 420 hovers over the objects in the visual representation. The visual search engine receives the limited amount of information from the objects database. In certain embodiments, the information is displayed on the graphical user interface 400 below the search box 410 when the user hovers over an object in the two-dimensional representation. In another embodiment, the metadata display 430 may also be generated in a three-dimensional representation of the objects when the user hovers over an object.

The two-dimensional representation 440 includes objects that satisfies the selections made by the user or the queries provided by the user. The visual search engine may generate the two-dimensional representation 440 when the set of objects is viewable within the display region of the graphical user interface without scrolling. The visual search engine traverses the objects database to obtain the images that are associated with each object in the set of objects. In turn, the visual search engine renders the images associated with each object in the two-dimensional representation 440.

In certain embodiments, the two-dimensional representation 440 includes object labels 450. The visual search engine receives the information for each object label 450 from the objects database. In turn, the visual search engine renders a specific amount of data in the object label based on the number of objects that are displayed within the two-dimensional representation 440. When the number of objects in the two-dimensional representation 440 covers more than a threshold amount of the total viewable region of the graphical user interface 400, the visual search engine renders less information for each object. For instance, when the number of objects in the two-dimensional representation 440 covers more than 80 percent of the total viewable region of the graphical user interface 400, the visual search engine may only render title information in the object label 450 for each object in the two-dimensional representation 440. Otherwise, the visual explore engine, may render the title information, and the values for attribute frequently used to narrow a set of objects in the object label 450.

In another embodiment, the two-dimensional representation generated by the visual search engine includes object labels that contain additional information for each object. The additional information comprises values associated with attributes associated with the objects that were not previously rendered by the visual explore engine. The additional information may be stored in the objects database. The additional information allows the user to determine whether the objects displayed in the two-dimensional representation satisfy unspecified user criteria associated with the additional information. When the objects in the two-dimensional representation satisfy the user, the user may click on the object to initiate a subsequent action that helps the user complete the task or takes the user to additional information about the object. For instance, the click may initiate a search query corresponding to the object. If the object represents a consumer electronics product, e.g. digital camera, the click may initiate a purchase transaction on a purchase page corresponding to the camera. If the object represents a travel product, e.g., travel to a destination city, monument, or memorial, the click may initiate a search for accommodations and transportation to the destination. Alternatively, when the objects in the two-dimensional representation fail to satisfy the user, the user may continue searching by entering new search terms or selecting a category control that starts a new visual search.

Figure 5:
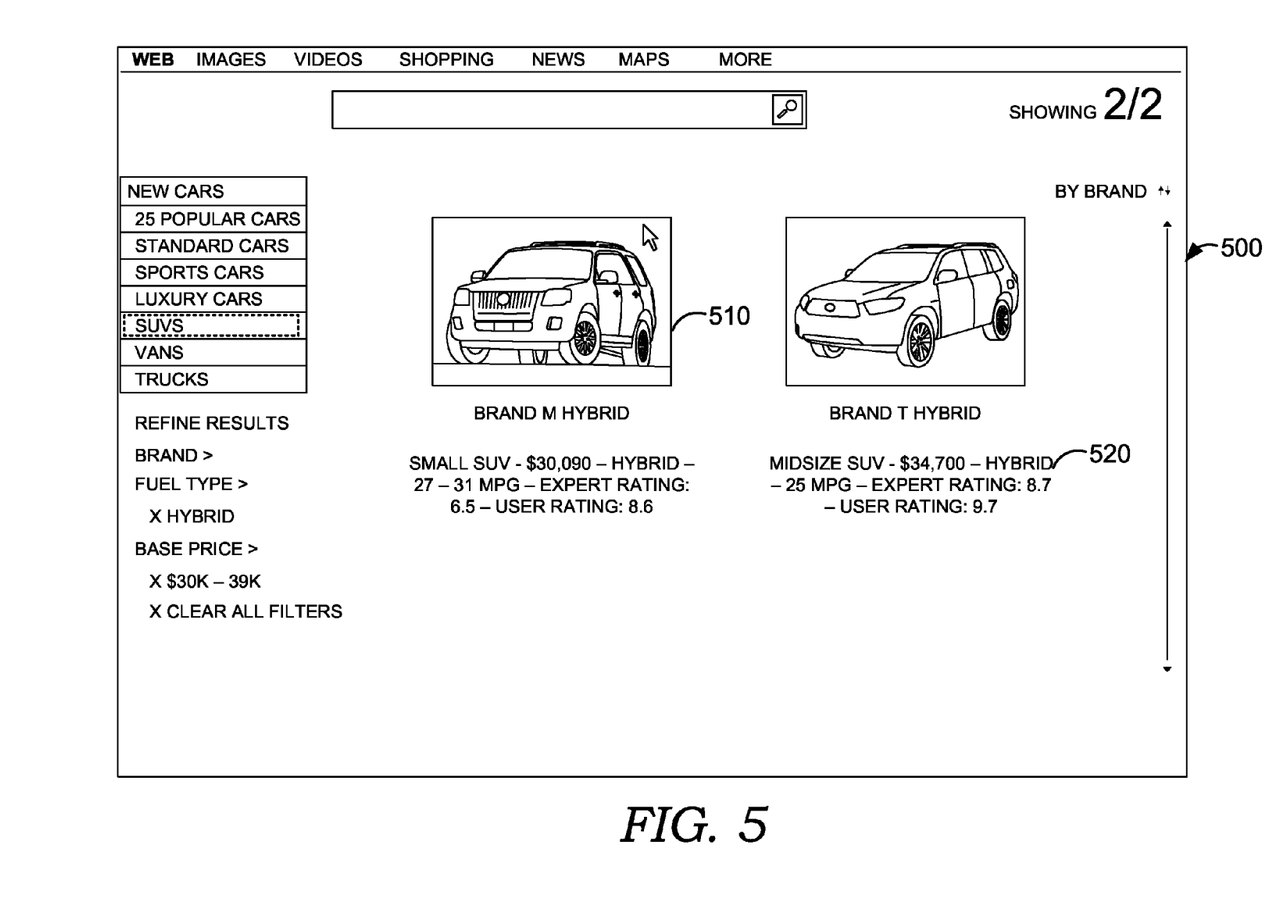
FIG. 5 is a graphical user interface that illustrates a set of objects that match the criteria provided by category or refine controls in accordance with embodiments of the invention.

FIG. 5 is a graphical user interface 500 that illustrates a set of objects that match the criteria provided by category or refine controls in accordance with embodiments of the invention. The graphical user interface 500 includes a two-dimensional representation 510 and object labels 520.

The visual search engine may generate the two-dimensional representation 510 in graphical user interface 500 when the number of objects that are selected for display is viewable without scrolling. The two-dimensional representation 510 includes objects that satisfies the selections made by the user or the queries provided by the user. The visual search engine traverses the objects database to obtain the images that are associated with each object of the set of objects. In turn, the visual search engine renders the images associated with each object in the two-dimensional representation 510.

In certain embodiments, the two-dimensional representation 510 includes object labels 520. The visual search engine receives the information for each object label 520 from the objects database. In turn, the visual search engine renders the values of attributes that are frequently used by users to reduce the set of objects in the object labels 520.

The objects selected by the visual search engine may be refined based on the context of the user interacting with the visual explore engine. The context of the user may include, but is not limited to, current user location, prior browsing history, or current configuration of the user's client device configuration. The visual search engine my use the context information to filter the objects selected from the objects database or the results provided by the index servers that correspond to an object selected by the user.

In some embodiments, an object in the two-dimensional representation is selected by the user. In turn, the visual search engine generates a graphical user interface that includes data from the object database and the URLs from the index servers. The graphical user interface displays the search results from the index server and object database to the user.

Figure 6:
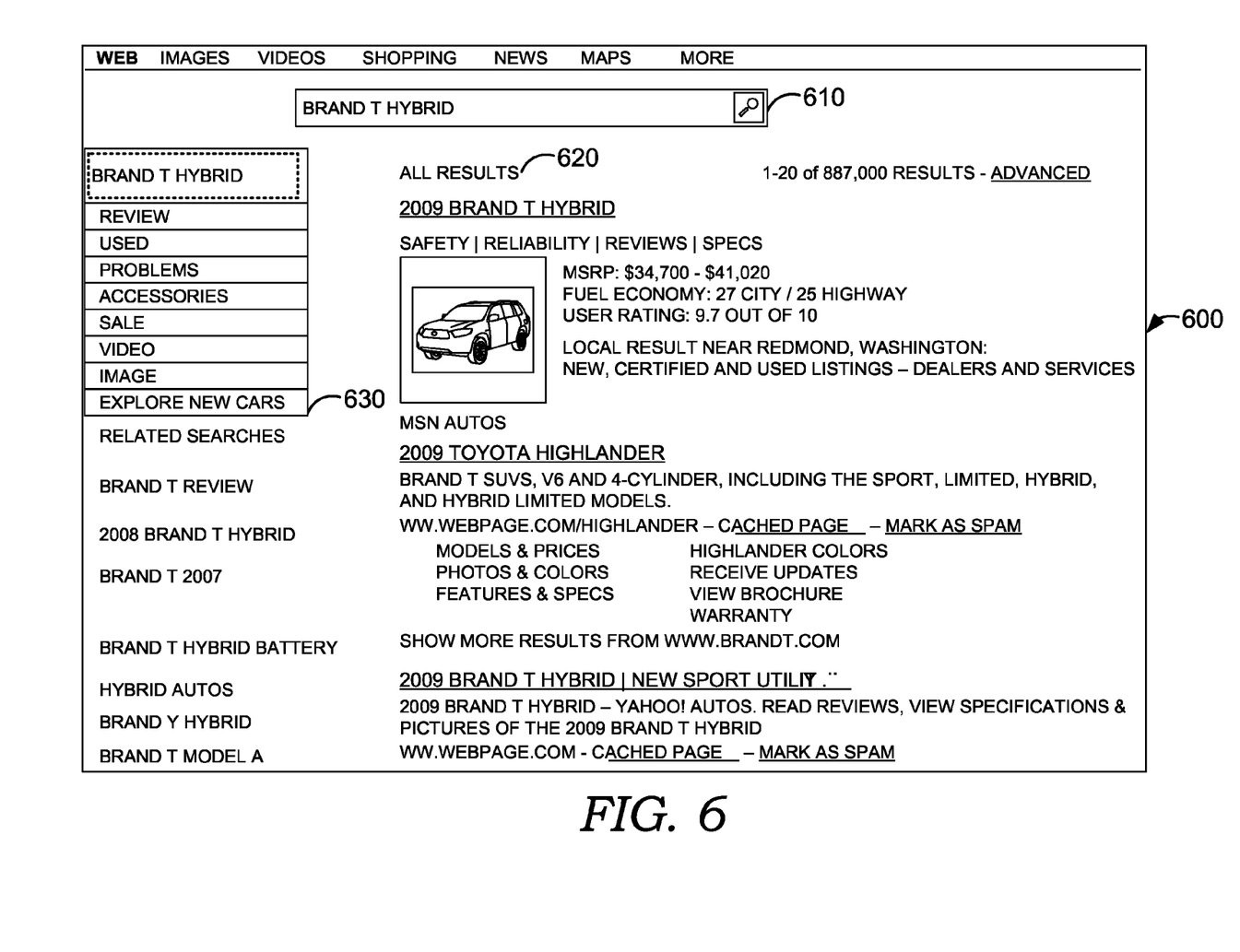
FIG. 6 is a graphical user interface that illustrates a result set generated in response to click action in accordance with embodiments of the invention.

FIG. 6 is a graphical user interface 600 that illustrates a result set 620 generated in response to click action in accordance with embodiments of the invention. The graphical user interface 600 includes a search box 610, search results 620, and a visual search link 630.

The visual search engine generates the graphical user interface 600 when the user clicks on an object with the pointer or selects an object. The search box 610 includes a search icon that causes the visual search engine to initiate a search with the search terms contained within the search box 610. The search box 610 automatically displays the search query associated with the selected object. Because the user selected the object with the pointer, the visual search engine searches the index server and object database using the search query associated with the clicked object.

In turn, the visual search engine updates the graphical user interface 600 with search results 620. The search results 620 include an image associated with the selected object and values for a subset of the attributes that correspond to the selected object. In some embodiments, the values and corresponding subset of attributes are selected from the attributes that are frequently used by users to narrow the set of objects to the same selected object. The visual search engine may receive the image for the selected object and the corresponding attributes and values from the object database. The search results 620 also include URLs. The visual search engine receives the URLs from the index servers. The URLs point to web pages that contain the terms included in the search query of the selected object.

The graphical user interface 600 includes a visual search link 630. The visual search link 630 allows the user to begin a new visual search of a set of objects for an object that satisfies the user. In some embodiments, when the user clicks on the visual explore link, the visual search engine generates a two-dimensional or three-dimensional representation having a previously generated set of objects.

In some embodiments, the visual search engine executes a method to visually search and explore a set of objects. The visual search engine receives a user query and determines whether to include a visual search link in a graphical user interface generated by the visual explore engine. The visual search link is prominently included in the graphical user interface when the user appears to be performing a search that is not directed to one particular object in the object database. When the user is performing a search that is directed to a particular object, the visual search link is less prominent.

Figure 7:
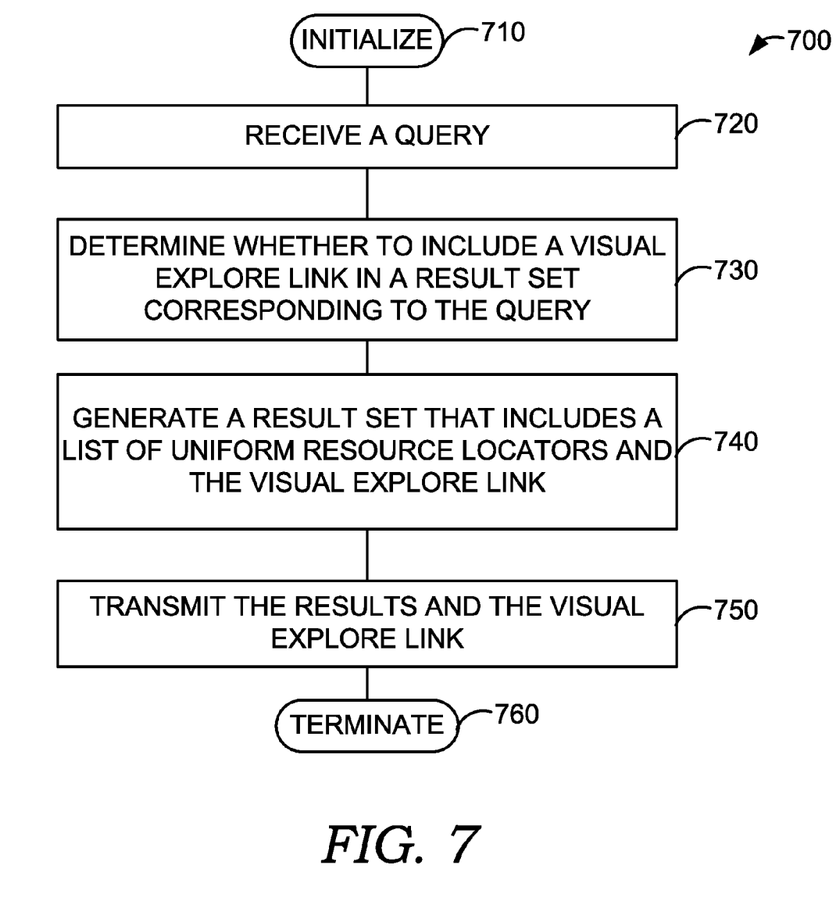
FIG. 7 is a logic diagram that illustrates a method to visually search through and explore a set of objects in accordance with embodiments of the invention.

FIG. 7 is a logic diagram that illustrates a method to visually search through and explore a set of objects in accordance with embodiments of the invention. The computer-implemented method is initialized by the visual search engine in step 710. The visual search engine is executed by a server that is communicatively connected to a client device. In step 720, the server receives a query from the client device. In step 730, the server determines whether to include a visual search link in a result set corresponding to the query. In step 740, the server generates a result set that includes a list of uniform resource locators and the visual search link when the user query is general or specific. The results and the visual search link are transmitted from the server to the client device, in step 750.

The visual search link is configured to link to a three-dimensional interface or a two-dimensional interface having a collection of images corresponding to the set of objects that match the query. Each image is associated with a subsequent object query comprising metadata associated with the object corresponding to the image. The subsequent object query may be executed by the server in response to a click on an image corresponding to the object. When the server receives the subsequent object query, the server may generate a results page having uniform resource locators (URLs) associated with web pages or documents that contain the terms of the subsequent query and information received from the objects database.

The three-dimensional representation and the two-dimensional representation generated by the server may dynamically vary image dimensions in the collection images associated with the objects. Additionally, the three-dimensional representation and the two-dimensional representation generated by the server may dynamically vary metadata displayed in the three-dimensional representation and the two-dimensional representation. The server may generate a three-dimensional representation or a two-dimensional representation that dynamically varies controls included in the three-dimensional representation and the two-dimensional representation based on attributes of objects within the set of objects. The controls may refine, filter, categorize, or sort the set of objects. The method terminates in step 760.

In an embodiment, the visual search engine identifies a match with a user query and selects a prominence assigned to the visual explore link. When the match is a general match, the visual search engine generates a very prominent visual search link to attract the user attention. For instance, position within the category control, color, size, or shape may be used to alter the prominence of the visual explore link. A higher position in the category control may correlate to very prominent and a lower position in the category control may correlate to low prominence.

In some embodiments, the visual search engine may identify a conceptual match, a conceptual subset match, and object level match. The conceptual matches cause the visual search engine to generate a very prominent visual search link to attract the user attention because the user search terms are very general. The conceptual matches may match the categories assigned to the objects. The conceptual subset match causes the visual search engine to generate a less prominent visual explore link. The conceptual subset matches may match the subcategories assigned to the objects. The object level match causes the visual search engine to generate the least prominent visual explore link. The object level match may match the actual object names assigned to the objects. In certain embodiments, the visual search engine generates synonyms for the user search terms based on definitions stored in a search log to identify the matches.

In summary, embodiments of the invention allow a user to visually explore a set of objects and assists the user with formulating a query for a specific item. The graphical user interface generated by the visual search engine displays the set of objects. The graphical user interface may also display metadata that describes the objects when the user hovers over the object. Additionally, the visual search engine may issue a query to the index server and objects database when the user selects an object in the graphical user interface.

The foregoing descriptions of the embodiments of the invention are illustrative, and modifications in configuration and implementation are within the scope of the current description. For instance, while the embodiments of the invention are generally described with relation to FIGS. 1-7, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. A computer system configured to visually search and explore a set of objects, the computer system comprising:
   a sever computer to receive a visual search request from a user and to process a visual search request;
   a database storing objects that include a plurality of attributes, wherein each object has a corresponding image;
   the server computer communicatively connected to the database to retrieve a set of images and attributes in response to the visual search request, wherein the server computer determines whether to include a visual search link in search results having the set of images and attributes, wherein the set of images is rendered in a three-dimensional interface or a two-dimensional interface based on a number of images that are within the set of images when the user accesses the visual search link the two-dimensional interface is provided if the number of images is below a threshold and the three-dimensional interface is provided if the number of images is above the threshold; and
   the server computer generates a graphical user interface to organize the images and attributes and dynamically transitions between the three-dimensional interface of the set of images to a two-dimensional interface of the set of images based on the size of the set, wherein the three-dimensional interface or the two-dimensional interface dynamically changing image sizes in the set of images based on the number of images that are within the set of images, dynamically changing metadata displayed in the three-dimensional interface or the two-dimensional interface based on the number of images that are within the set of images, and dynamically changing the sorting, filtering, and classification controls included in the three-dimensional interface or the two-dimensional interface based on attributes of images within the set of images.

2. The computer system of claim 1, wherein each image is associated with a command that initiates a subsequent action corresponding to the object.

3. The computer system of claim 1, wherein the command is a query that cause a search engine to return a result set that includes at least one of web pages, images, videos, or documents related to the object.

4. The computer system of claim 1, wherein a prominence of the visual search link dynamically change based on number of search results.

5. A computer-implemented method to visually search and explore a set of objects, the computer-implemented method comprising:
   receiving, by a sever computer, a visual search request from a user;
   processing, by the server computer, the visual search request;
   retrieving a set of images and attributes in response to the visual search request from a database storing objects that include a plurality of attributes, wherein each object has a corresponding image and the server computer is communicatively connected to the database;
   determining, by the server computer, whether to include a visual search link in search results having the set of images and attributes, wherein the set of images is prepared for rendering in a three-dimensional interface or a two-dimensional interface based on a number of images that are within the set of images when the user accesses the visual search link the two-dimensional interface is provided if the number of images is below a threshold and the three-dimensional interface is provided if the number of images is above the threshold; and
   generating, by the server computer, a graphical user interface to organize the images and attributes and to dynamically transition between the three-dimensional interface of the set of images to a two-dimensional interface of the set of images based on the size of the set, wherein the three-dimensional interface or the two-dimensional interface dynamically changing image sizes in the set of images based on the number of images that are within the set of images, dynamically changing metadata displayed in the three-dimensional interface or the two-dimensional interface based on the number of images that are within the set of images, and dynamically changing the sorting, filtering, and classification controls included in the three-dimensional interface or the two-dimensional interface based on attributes of images within the set of images.

6. The computer-implemented method of claim 5, wherein each image is associated with a command that initiates a subsequent action corresponding to the object.

7. The computer-implemented method of claim 5, wherein the command is a query that cause a search engine to return a result set that includes at least one of web pages, images, videos, or documents related to the object.

8. The computer-implemented method of claim 5, wherein a prominence of the visual search link dynamically change based on number of search results.

9. A computer-storage media, executing computer-usable instructions for performing a method to visually search and explore a set of objects, the computer-implemented method comprising:
   receiving, by a sever computer, a visual search request from a user;
   processing, by the server computer, the visual search request;
   retrieving, by the server computer, a set of images and attributes in response to the visual search request from a database storing objects that include a plurality of attributes, wherein each object has a corresponding image and the server computer is communicatively connected to the database;
   determining, by the server computer, whether to include a visual search link in search results having the set of images and attributes, wherein the set of images is prepared for rendering in a three-dimensional interface or a two-dimensional interface based on a number of images that are within the set of images when the user accesses the visual search link the two-dimensional interface is provided if the number of images is below a threshold and the three-dimensional interface is provided if the number of images is above the threshold; and
   generating, by the server computer, a graphical user interface to organize the images and attributes and to dynamically transition between the three-dimensional interface of the set of images to a two-dimensional interface of the set of images based on the size of the set, wherein the three-dimensional interface or the two-dimensional interface dynamically changing image sizes in the set of images based on the number of images that are within the set of images, dynamically changing metadata displayed in the three-dimensional interface or the two-dimensional interface based on the number of images that are within the set of images, and dynamically changing the sorting, filtering, and classification controls included in the three-dimensional interface or the two-dimensional interface based on attributes of images within the set of images.

10. The computer-storage media of claim 5, wherein each image is associated with a command that initiates a subsequent action corresponding to the object.

11. The computer-storage media of claim 5, wherein the command is a query that causes a search engine to return a result set that includes at least one of web pages, images, videos, or documents related to the object.

12. The computer-storage media of claim 5, wherein a prominence of the visual search link dynamically changing based on number of search results.

* * * * *